United States Patent
Feng et al.

(10) Patent No.: US 8,712,054 B2
(45) Date of Patent: Apr. 29, 2014

(54) METHOD AND SYSTEM FOR ESTABLISHING ENHANCED KEY WHEN TERMINAL MOVES TO ENHANCED UNIVERSAL TERMINAL RADIO ACCESS NETWORK (UTRAN)

(75) Inventors: Chengyan Feng, Shenzhen (CN); Xintai Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/515,186

(22) PCT Filed: Apr. 2, 2011

(86) PCT No.: PCT/CN2011/072442
§ 371 (c)(1),
(2), (4) Date: Jun. 11, 2012

(87) PCT Pub. No.: WO2011/127791
PCT Pub. Date: Oct. 20, 2011

(65) Prior Publication Data
US 2013/0028421 A1  Jan. 31, 2013

(30) Foreign Application Priority Data
Apr. 16, 2010 (CN) .......................... 2010 1 0165581

(51) Int. Cl.
*H04L 9/28* (2006.01)
*H04W 12/04* (2009.01)
*H04W 12/02* (2009.01)
*H04W 12/00* (2009.01)

(52) U.S. Cl.
CPC .............. *H04W 12/02* (2013.01); *H04W 12/00* (2013.01)
USPC .......................................... 380/270; 380/278

(58) Field of Classification Search
CPC .............................. H04W 12/00; H04W 12/02
See application file for complete search history.

(56) References Cited

FOREIGN PATENT DOCUMENTS

| CN | 101232731 A | | 7/2008 | |
|---|---|---|---|---|
| CN | 200910148423.7 | * | 6/2009 | .................... 455/436 |
| CN | 101835152 A | | 9/2010 | |

OTHER PUBLICATIONS

Translation of CN200910148423.7—translation completed on Aug. 21, 2013.*
3rd Generation Partnership Project: Technical Specification Group Services and System Aspects; Study on the Introduction of the EPS Key Hierarchy in UMTS (Release 9), 3GPP TR33.cde Vx.y.z, Apr. 7, 2008.
International Search Report for PCT/CN2011/072442 dated Jun. 24, 2011.

* cited by examiner

*Primary Examiner* — Gilberto Barron, Jr.
*Assistant Examiner* — Devin Almeida
(74) *Attorney, Agent, or Firm* — Ling Wu; Stephen Yang; Ling and Yang Intellectual Property

(57) ABSTRACT

The present invention discloses a method and system for establishing an enhanced key when a terminal moves from an EUTRAN to an enhanced UTRAN, so as to ensure that the terminal can carry out normal communication safely in the enhanced UTRAN. The method includes: when the terminal moves from the EUTRAN to the enhanced UTRAN, a target enhanced serving GPRS support node (SGSN+) in the enhanced UTRAN deducing an intermediate key used in the UTRAN according to a mapped traditional key obtained from a source mobile management entity; and the terminal, after deducing the mapped traditional key, further deduces the intermediate key used in the enhanced UTRAN by using an algorithm which is the same as that of the target SGSN+ according to the mapped traditional key.

19 Claims, 10 Drawing Sheets

METHOD AND SYSTEM FOR ESTABLISHING ENHANCED KEY WHEN TERMINAL MOVES TO ENHANCED UNIVERSAL TERMINAL RADIO ACCESS NETWORK (UTRAN)

TECHNICAL FIELD

The present invention relates to the wireless communication field, and particularly, to a method and system for establishing an enhanced key when a terminal moves from an EUTRAN to an enhanced UTRAN in a wireless communication system.

BACKGROUND OF THE RELATED ART

In Release7, 3GPP (3rd Generation Partnership Project) adopts technologies of orthogonal frequency division multiplexing (abbreviated as OFDM) and multiple-input multiple-output (abbreviated as MIMO) to complete a future evolved path HSPA+ of HSDPA (High Speed Downlink Packet Access) and HSUPA (High Speed Uplink Packet Access). HSPA+ is an enhanced technology of 3GPP HSPA (including HSDPA and HSUPA), which provides an approach of smoothly evolving from HSPA to LTE with low complexity and low cost for HSPA operator.

HSPA+ enhances peak data rate and spectrum efficiency by adopting technologies such as a high order modulation (such as downlink 64QAM (Quadrature Amplitude Modulation) and uplink 16QAM), a MIMO and the combination of high order modulation and MIMO, etc. On the other hand, in order to better support packet services, HSPA+ also adopts a series of other enhanced technologies to achieve the objects of increasing user capacity, reducing time delay, reducing electricity consumption of the terminal, better supporting the voice over IP communication (VOIP) and enhancing multicast/broadcast abilities of the system, etc.

Compared with HSPA, HSPA+ devolves functions of a radio network controller (abbreviated as RNC) to a base station node B (Node B) on a system architecture, to form a completely flattened radio access network architecture, as shown in FIG. 1. At the moment, the Node B integrated with the complete RNC functions is referred to as an Evolved HSPA Node B or abbreviated as enhanced Node B (Node B+). SGSN+ is the SGSN (SERVICE GPRS (General Packet Radio System) SUPPORT NODE) which is upgraded to be able to support the HSPA+ functions. ME+ is a user terminal equipment which can support the HSPA+ functions (also referred to as UE+). The evolved HSPA system can employ 3GPP Rel-5 and the later air interface version without any modification to the HSPA services of the air interface. After adopting this solution, each Node B+ becomes a node equivalent to RNC and has an Iu-PS interface which can be directly connected with a PS CN (Core Network); an Iu-PS user plane terminates in the SGSN; wherein, if the network supports the direct tunnel function, the Iu-PS user plane can also terminate in a GGSN (Gateway GPRS Support Node). The communication between the evolved HSPA Nodes B is performed via an Iur interface. The Node B+ has independent networking ability and supports the whole mobility function, including inter-system and intra-system handover.

In the HSPA+, Node B+ can be viewed as a combination of Node B and RNC. Both of them are one physical entity, but they are still 2 different logic entities. Therefore, herein, the Node B+ which supports a HSPA+ enhanced key hierarchy can also be equivalent to the upgraded RNC in the UMTS. For the sake of distinguishing, it can be referred to as RNC+.

The structure of the currently proposed HSPA+ enhanced security key hierarchy is shown in FIG. 2. Definitions of K (Key, i.e., root key), CK (Ciphering key) and IK (Integrity key) are completely consistent with those in UMTS (Universal Mobile Telecommunications System). That is, K is a root key stored in an AuC (Authentication Center) and a USIM (UNIVERSAL SUBSCRIBER IDENTITY MODULE), CK and IK are the ciphering key and the integrity key calculated by K when the user equipment carries out an AKA (Authentication and Key Agreement) with an HSS. In the UMTS, the RNC uses CK and IK to carry out ciphering and integrity protection on the data. CK and IK can be referred to as conventional air interface security keys, abbreviated as conventional keys.

Since in the HSPA+ architecture, all the functions of the RNC are devolved to the base station Node B+, then the deciphering and ciphering need to be carried out in the Node B+; but the Node B+ is located in an insecure environment, and the security is not particularly high. Therefore, the HSPA+ introduces a key hierarchy similar to EUTRAN (Evolved Universal Terrestrial Radio Access Network), i.e., UTRAN key hierarchy. In the UTRAN key hierarchy structure, the intermediate key $K_{RNC}$ (also referred to as $K_{ASMEU}$ sometimes) is a key newly introduced by HSPA+ and generated by deducing from the conventional keys CK and IK. Further, $K_{RNC}$ generates $CK_U$ (also referred to as $CK_S$) and $IK_U$ (also referred to as $IK_S$), wherein, $CK_U$ is used for ciphering user plane data and control plane signalings, and $IK_U$ is used for carrying out the integrity protection to the control plane signalings. $CK_U$ and $IK_U$ are referred to as enhanced air interface security keys, abbreviated as enhanced keys.

LTE/SAE is an evolved technology for UMTS by 3GPP, which supports to provide the peak rate of downlink 100 Mbps and uplink 50 Mbps under the 20 MHz spectrum bandwidth. The network of LTE/SAE consists of a user equipment (UE), an access network and a core network. The whole LTR architecture is shown in FIG. 3. In the EUTRA, the base station equipment is an evolved Node-B (abbreviated as eNB), which is mainly responsible for wireless communication, wireless communication management and mobility context management. The core network includes a mobility management entity (abbreviated as MME), and the MME is responsible for control plane related works such as managing of the mobility management, processing of non-access stratum signaling, and managing of user security mode, etc.

When the user moves from the EUTRAN to the UTRAN, the source MME generates mapped traditional keys IK' and CK' according to the key $K_{ASME}$ in the LTE, and the deduction formula of the mapped traditional keys are as follows:

$$IK'\|CK'=KDF(K_{ASME}, \text{downlink NAS COUNT}),$$

wherein, KDF is a security algorithm defined by 3GPP, and its specific definition can make reference to 3GPP related specifications. $K_{ASME}$ is the key generated according to CK by the HSS, and is issued to the MME in the process of the AKA (Authentication and Key Agreement), for deducing the NAS (non-access stratum) key and AS (access stratum) key on the eNB. NAS COUNT is an NAS counter, and each EPS NAS security context is associated with 2 NAS COUNTs: one is an uplink NAS COUNT and the other is a downlink NAS COUNT. The length of the NAS COUNT is 24 bits, and is maintained by the UE and the MME independently. When the AKA runs successfully once and a new $K_{ASME}$ is generated, the NAS COUNT is initialized as 0.

The source MME sends the mapped traditional keys IK' and CK' which are obtained by deducing to the core network node SGSN of the target network. The target SGSN employs these mapped traditional keys to protect the communication between the user and the network.

With the introduction of HSPA+ security, due to the addition of key hierarchy, the enhanced keys $IK_U$ and $CK_U$ are employed between the user and the network to protect the communication therebetween. When the user moves from the EUTRAN to the UTRAN which supports the HSPA+ security function, how to establish the enhanced security keys of the HSPA+ via the mapped traditional keys is a problem to be solved.

CONTENT OF THE INVENTION

The technical problem to be solved by the present invention is to provide a method and system for establishing an enhanced key when a terminal moves from an EUTRAN to an enhanced UTRAN, so as to ensure that the terminal can carry out normal communication safely in the enhanced UTRAN.

In order to solve the above technical problem, the present invention provides a method for establishing an enhanced key when a terminal moves from an evolved universal terrestrial radio access network (EUTRAN) to an enhanced universal terrestrial radio access network (UTRAN), comprising:

when the terminal moves from the EUTRAN to the enhanced UTRAN, a target enhanced serving GPRS support node (SGSN+) in the enhanced UTRAN deducing an intermediate key used in the UTRAN according to a mapped traditional key obtained from a source mobility management entity; and the terminal, after deducing the mapped traditional key, further deducing the intermediate key used in the enhanced UTRAN by using an algorithm which is the same as that of the target SGSN+ according to the mapped traditional key.

Preferably, the method further comprises: when the terminal is in an activated state, the target SGSN+, after deducing the intermediate key, sending the intermediate key to a target enhanced radio network controller (RNC+) in the enhanced UTRAN, and the target RNC+ deducing an enhanced air interface integrity key ($IK_U$) and/or an enhanced air interface ciphering key ($CK_U$) according to the intermediate key; and the terminal, after deducing the intermediate key, further deducing an enhanced air interface key by using an algorithm which is the same as that of the target RNC+ according to the intermediate key.

Preferably, the method further comprises: when the terminal is in an activated state, the target SGSN+, after deducing the intermediate key, further deducing an enhanced air interface integrity key ($IK_U$) and/or an enhanced air interface ciphering key ($CK_U$) according to the intermediate key, and sending the deduced enhanced air interface key to a target enhanced radio network controller (RNC+); and the terminal, after deducing the intermediate key, further deducing an enhanced air interface key by using an algorithm which is the same as that of the target SGSN+ according to the intermediate key.

Preferably, the method further comprises: the target SGSN+ deducing a deformation intermediate key according to the mapped traditional key and the intermediate key, and sending the deformation intermediate key to the target RNC+, wherein the deformation intermediate key is adapted for updating the enhanced air interface key when the terminal carries out relocation of a service radio network controller (SRNC) in the enhanced UTRAN network.

Preferably, the method further comprises: the target SGSN+ setting an associated counter for the deformation intermediate key while deducing the deformation intermediate key, wherein the counter is adapted for recording the number of times of generating the deformation intermediate key.

Preferably, the method further comprises: the target SGSN+ sending a value of the counter with the deformation intermediate key together to the target RNC+.

Preferably, the message of the target SGSN+ sending the key to the target RNC+ is a Relocation Request message.

Preferably, the algorithm for deducing the enhanced air interface key is: the enhanced air interface integrity key ($IK_U$)=a mapped traditional integrity key (IK'); and the enhanced air interface ciphering key ($CK_U$)=a mapped traditional ciphering key (CK').

Preferably, the step of the target SGSN+ deducing the intermediate key used in the UTRAN according to the mapped traditional key obtained from the source mobility management entity comprises: deducing the intermediate key used in the enhanced UTRAN according to the mapped traditional key and further in combination with a first parameter; the step of the terminal deducing the intermediate key used in the enhanced UTRAN by using the algorithm which is the same as that of the target SGSN+ according to the mapped traditional key comprises: deducing the intermediate key used in the enhanced UTRAN by using the algorithm which is the same as that of the target SGSN+, similarly according to the mapped traditional key and further in combination with the first parameter; and the first parameter is sent to the terminal by the target SGSN+, or agreed with the terminal by the target SGSN+.

Preferably, in the process of deducing the enhanced air interface key according to the intermediate key, the enhanced air interface key is deduced according to the intermediate key and further in combination with a second parameter.

Preferably, the first parameter comprises one or more of the following parameters: a Public Land Mobile Network identifier (PLMN identifier), a core network node type, a sequence number (SQN), an Anonymity Key (AK), a user identifier and a random number generated by the target SGSN+.

Preferably, the second parameter comprises one or more of the following parameters: a fresh random number (FRESH) generated by a target radio network controller (RNC), an encryption algorithm identifier (enc-alg-ID), an integrity algorithm identifier (int-alg-ID), a physical cell identifier (PCI) of an enhanced node B, an absolute frequency point (UARFCN) of the enhanced node B, a scrambling code allocated to the terminal by the target RNC, a user identifier, a target RNC identifier, a start (START) parameter defined in a universal mobile communication system, an integrity sequence number (COUNT-I) parameter defined in the universal mobile communication system, a radio resource control sequence number (RRC SN) parameter defined in the universal mobile communication system, and a random number generated by the target SGSN+.

Preferably, the random number generated by the target SGSN+ is sent to the terminal through the following paths: a Forward Relocation Response message sent by the target SGSN+ to the source mobility management entity, a handover command message sent by the source mobility management entity to a source base station, and a Handover from EUTRAN Command message sent by the source base station to the terminal.

Preferably, when the terminal is in an idle state, the step of the target SGSN+ deducing the intermediate key used in the UTRAN according to the mapped traditional key obtained from the source mobility management entity comprises: deducing the intermediate key used in the enhanced UTRAN according to the mapped traditional key and further in combination with a first parameter; the step of the terminal deducing the intermediate key used in the enhanced UTRAN by using an algorithm which is the same as that of the target SGSN+ according to the mapped traditional key comprises: deducing the intermediate key used in the enhanced UTRAN by using the algorithm which is the same as that of the target SGSN+, similarly according to the mapped traditional key and further in combination with the first parameter.

Preferably, the first parameter comprises one or more of the following parameters: a Public Land Mobile Network identifier (PLMN identifier), a core network node type, a sequence number (SQN), an Anonymity Key (AK), a user identifier, a random number generated by the target SGSN+ and a random number generated by the terminal.

Preferably, the random number generated by the target SGSN+ is sent to the terminal through a routing area update accepted message.

Preferably, the random number generated by the terminal is sent to the target SGSN+ through a routing area update request message.

In order to solve the above technical problem, the present invention also provides a system for establishing an enhanced key when a terminal moves from an evolved universal terrestrial radio access network (EUTRAN) to an enhanced universal terrestrial radio access network (UTRAN), comprising a terminal and a target enhanced serving GPRS support node (SGSN+) in the enhanced UTRAN; wherein, the SGSN+ is configured to: when the terminal moves from the EUTRAN to the enhanced UTRAN, deduce an intermediate key used in the UTRAN according to a mapped traditional key obtained from a source mobility management entity; and the terminal is configured to: deduce the mapped traditional key, and, after deducing and obtaining the mapped traditional key, further deduce the intermediate key used in the enhanced UTRAN by using an algorithm which is the same as that of the SGSN+ according to the mapped traditional key.

Preferably, the system further comprises a target enhanced radio network controller (RNC+) in the enhanced UTRAN; wherein, the SGSN+ comprises: a first receiving unit, a first key deduction unit and a first sending unit, wherein:

the first receiving unit is configured to: receive the mapped traditional key sent by the source mobility management entity;

the first key deduction unit is configured to: deduce the intermediate key according to the mapped traditional key; and the first sending unit is configured to: send the deduced intermediate key to the RNC+;

the RNC+ is configured to: deduce an enhanced air interface integrity key ($IK_U$) and/or an enhanced air interface ciphering key ($CK_U$) according to the intermediate key; and the terminal comprises: a second receiving unit and a second key deduction unit, wherein:

the second receiving unit is configured to: receive a command sent by a network side; and the second key deduction unit is configured to: deduce the mapped traditional key according to the command, deduce the intermediate key by using the algorithm which is the same as that of the SGSN+ according to the mapped traditional key obtained by deducing, and deduce an enhanced air interface key by using an algorithm which is the same as that of the RNC+ according to the intermediate key.

Preferably, the system further comprises a target enhanced radio network controller (RNC+) in the enhanced UTRAN; wherein, the SGSN+ comprises: a first receiving unit, a first key deduction unit and a first sending unit, wherein:

the first receiving unit is configured to: receive the mapped traditional key sent by the source mobility management entity;

the first key deduction unit is configured to: deduce the intermediate key according to the mapped traditional key, and deduce an enhanced air interface integrity key ($IK_U$) and/or an enhanced air interface ciphering key ($CK_U$) according to the intermediate key; and the first sending unit is configured to: send the deduced enhanced air interface key to the RNC+;

the RNC+ is configured to: store the received enhanced air interface key; and the terminal comprises: a second receiving unit and a second key deduction unit, wherein:

the second receiving unit is configured to: receive a command sent by a network side; and the second key deduction unit is configured to: deduce the mapped traditional key according to the command, deduce the intermediate key by using the algorithm which is the same as that of the SGSN+ according to the mapped traditional key obtained by deducing, and deduce an enhanced air interface key by using an algorithm which is the same as the SGSN+ according to the intermediate key.

Preferably, the first key deduction unit of the SGSN+ is further configured to: deduce a deformation intermediate key according to the mapped traditional key and the intermediate key, and send the deformation intermediate key to the target RNC+, wherein the deformation intermediate key is adapted for updating the enhanced air interface key when the terminal carries out relocation of a service radio network controller (SRNC) in the enhanced UTRAN network.

With the method in the present invention, when the terminal moves from the E-UTRAN to the enhanced UTRAN, the network side and the terminal can respectively establish an enhanced key system according to the mapped traditional keys without repeating the AKA process, thereby saving network overhead, improving system efficiency, and ensuring the secure communication between the terminal and the enhanced UTRAN network.

BRIEF DESCRIPTION OF DRAWINGS

The accompanying drawings illustrated here are used for providing further understanding to the present invention, and constitute a part of the present application. The exemplary embodiments of the present invention and the description thereof are used to explain the present invention, and do not constitute improper limitation to the present invention.

PREFERRED EMBODIMENTS OF THE PRESENT INVENTION

Figure 1:
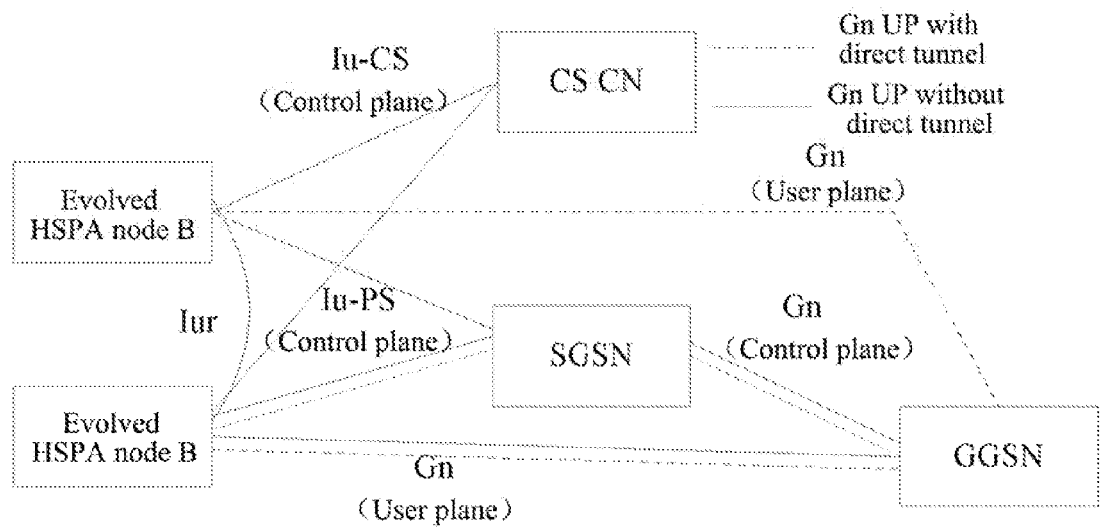
FIG. 1 is a schematic diagram of an architecture of a radio access network adopting an HSPA+ technology in the related art.
Figure 2:
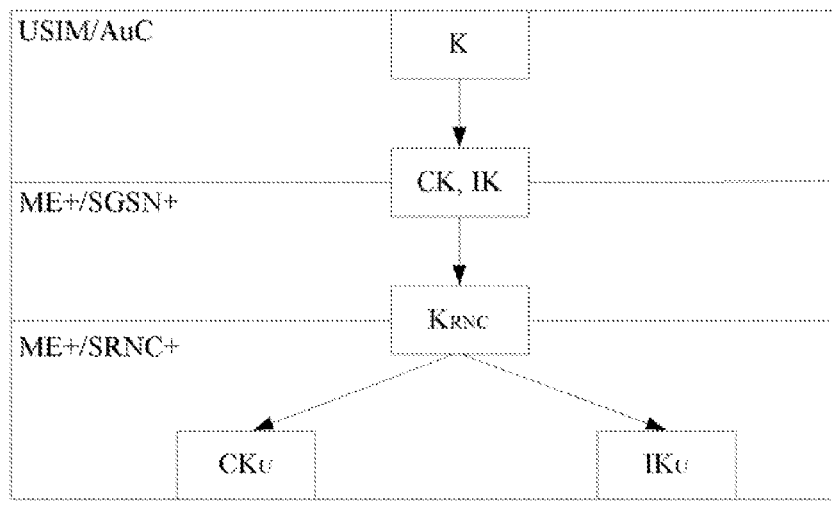
FIG. 2 is a structural diagram of an HSPA+ enhanced security key hierarchy in the related art.
Figure 3:
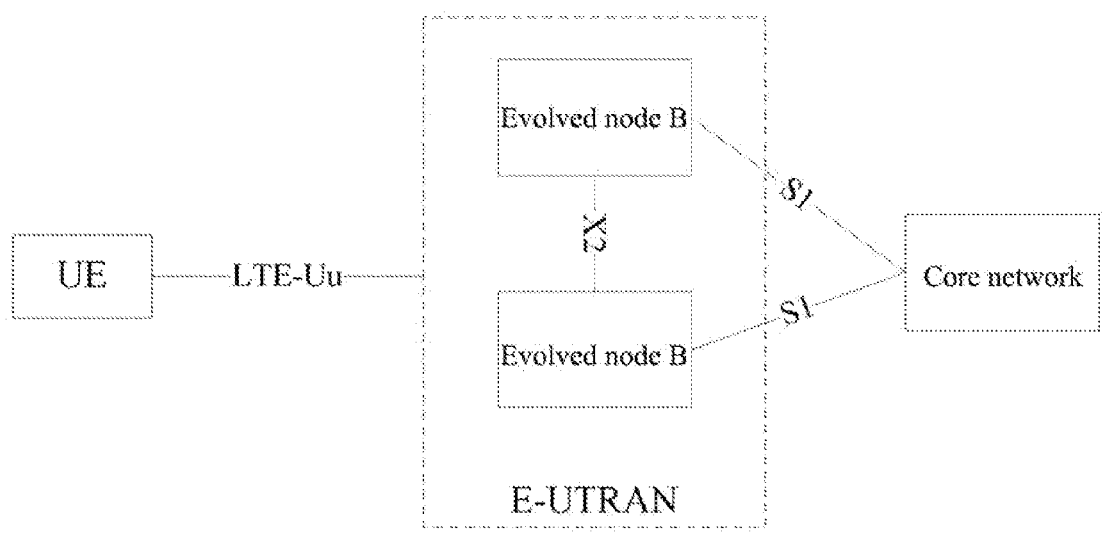
FIG. 3 is a schematic diagram of an architecture of an LTE/SAE in the related art.

The principle of the present invention is as follows: when a terminal moves from an EUTRAN to a UTRAN which supports an HSPA+ security function (i.e., an enhanced UTRAN, abbreviated as enhanced UTRAN hereinafter), a target SGSN+ in the enhanced UTRAN deduces an intermediate key used in the UTRAN according to a mapped traditional key obtained from a source mobility management entity; and after deducing the mapped traditional key, the terminal further deduces the intermediate key ($K_{RNC}$) used in the enhanced UTRAN by using an algorithm which is the same as that of the target SGSN+ according to the mapped traditional key.

When the terminal is in an activated state, the target SGSN+ obtains the mapped traditional key from the source mobility management entity through a Forward Relocation Request message. After deducing the intermediate key, the target SGSN+ sends the intermediate key $K_{RNC}$ to the target radio network controller (RNC+) in the enhanced UTRAN through a key distribution message (such as, Relocation Request message), and the target RNC+ deduces an enhanced air interface key ($IK_U$ and/or $CK_U$) according to the intermediate key $K_{RNC}$. After deducing the intermediate key used in the enhanced UTRAN, the terminal further deduces the enhanced air interface key ($IK_U$ and/or $CK_U$) by using an algorithm which is the same as the target RNC+ according to the intermediate key.

Alternatively, after deducing the intermediate key, the target SGSN+ further deduced the enhanced air interface key $IK_U$ and/or $CK_U$ according to the intermediate key, and issues the enhanced air interface key $IK_U$ and/or $CK_U$ to the target RNC+ through the key distribution message (such as, Relocation Request message), and the target RNC+ stores the air interface integrity key $IK_U$ and/or ciphering key $CK_U$; after deducing the intermediate key used in the enhanced UTRAN, the terminal further deduces the enhanced air interface key $IK_U$ and/or $CK_U$ by using an algorithm which is the same as that of the target SGSN+ according to the intermediate key.

The target SGSN+ deduces a deformation intermediate key according to the mapped traditional key and the intermediate key, and sends the deformation intermediate key to the target radio network controller (RNC+) in the enhanced UTRAN through a key distribution message (such as, Relocation Request message), wherein the deformation intermediate key is adapted for updating the enhanced air interface keys $IK_U$ and $CK_U$ when the terminal carries out relocation of a service radio network controller (SRNC) in the enhanced UTRAN network. Preferably, the target SGSN+ sets an associated counter for the deformation intermediate key while deducing the deformation intermediate key, and the counter is adapted for recording the number of times of generating the deformation intermediate key. The target SGSN+ can send the value of the counter to the RNC+ simultaneously.

Preferably, the algorithm for deducing the enhanced air interface key is: $IK_U$=IK' and $CK_U$=CK'.

The target SGSN+, in the process of deducing the intermediate key, deduces the intermediate key used in the enhanced UTRAN according to the mapped traditional key and further in combination with a first parameter; the terminal, in the process of deducing the intermediate key, also deduces the intermediate key used in the enhanced UTRAN by using the algorithm which is the same as that of the target SGSN+ according to the mapped traditional key and further in combination with the first parameter; and the first parameter is the parameter sent to the terminal by the target SGSN+, or agreed with the terminal by the target SGSN+.

In the process of deducing the enhanced air interface key ($IK_U$ and/or $CK_U$) according to the intermediate key, the enhanced air interface key $IK_U$ and/or $CK_U$ is deduced according to the intermediate key and further in combination with a second parameter.

The first parameter comprises one or more of the following parameters: a Public Land Mobile Network identifier (PLMN identifier), a core network node type, a sequence number (SQN), an anonymity key (AK), a user identifier, and a random number generated by the target SGSN+.

The second parameter comprises one or more of the following parameters: a fresh random number (FRESH) generated by a target radio network controller (RNC), an encryption algorithm identifier (enc-alg-ID), an integrity algorithm identifier (int-alg-ID), a physical cell identifier (PCI) of an enhanced node B, an absolute frequency point (UARFCN) of the enhanced node B, a scrambling code allocated to the terminal by the target RNC, a user identifier, a target RNC identifier, a start (START) parameter defined in a universal mobile communication system, an integrity sequence number (COUNT-I) parameter defined in the universal mobile communication system, a radio resource control sequence number (RRC SN) parameter defined in the universal mobile communication system, and a random number generated by the target SGSN+.

When the terminal is in an idle state, the target SGSN+ obtains the mapped traditional keys from the source mobility management entity through a context response message. The target SGSN+, in the process of deducing the intermediate key, deduces the intermediate key used in the enhanced UTRAN according to the mapped traditional key and further in combination with a first parameter; the terminal, in the process of deducing the intermediate key, also deduces the intermediate key used in the enhanced UTRAN by using the algorithm which is the same as that of the target SGSN+ according to the mapped traditional key and further in combination with the first parameter.

The first parameter comprises one or more of the following parameters: a Public Land Mobile Network identifier (PLMN identifier), a core network node type, a sequence number (SQN), a anonymity key (AK), a user identifier, a random number $NONCE_{SGSN}$ generated by the target SGSN+, and a random number $NONCE_{UE}$ generated by the terminal.

The above random number $NONCE_{SGSN}$ is generated by the target SGSN+ after the target SGSN+ receives a Forward Relocation Request message sent by the source MME, and is sent to the terminal by way of midway forwarding of the source MME and the source base station; or, this random number is generated by the target SGSN+ after the target SGSN+ receives a routing area update request message sent by the terminal, and is sent to the terminal by way of a routing area update accepted message.

The above random number $NONCE_{UE}$ is generated by the terminal before the terminal sends the routing area update request message to the target SGSN+, and is sent to the target SGSN+ by way of the routing area update request message.

The above FRESH is generated by the target RNC+ after the target RNC+ receives the Relocation Request message sent by the target SGSN+. This FRESH parameter is sent to the terminal by way of midway forwarding of the target SGSN+, the source MME and the source base station.

The present invention will be described in detail with reference to the accompanying drawings and in combination with embodiments below, wherein, in embodiments 1-4 the state of the terminal is the activated state, and in embodiments 5-6, the state of the terminal is the idle state.

Embodiment 1

Figure 4:
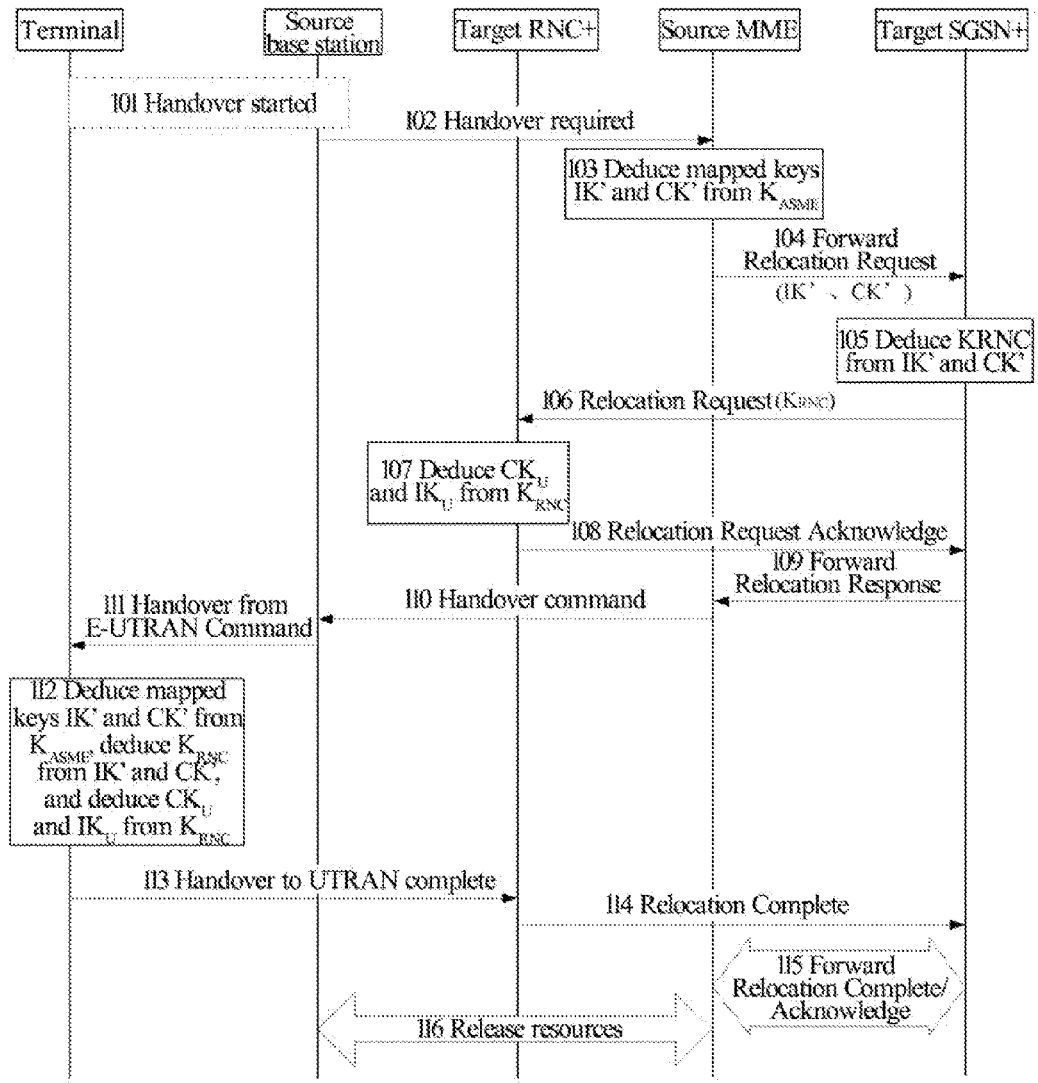
FIG. 4 is a flowchart of an embodiment one of the present invention.

This embodiment describes an example of an air interface key management flow when the terminal moves from the EUTRAN to the enhanced UTRAN; and in this embodiment, the target SGSN+ is responsible for deducing $K_{RNC}$, and the target RNC+ is responsible for deducing the enhanced keys $CK_U$ and $IK_U$. As shown in FIG. 4, it includes the following steps.

In step 101, the source base station decides to switch from the E-UTRAN network to the target enhanced UTRAN network.

In step 102, the source base station sends a handover required message to the source MME.

In step 103, the source MME acknowledges that the terminal is to switch to the UTRAN, and deduces the mapped traditional keys IK' and CK' according to $K_{ASME}$.

When the terminal is in the LTE network, both the terminal and the MME store the $K_{ASME}$. The deduction formula of the mapped traditional keys IK' and CK' follows the LTE relevant protocol definition, which will not be repeated herein.

In step 104, the source MME sends a Forward Relocation Request message to the target SGSN to request the target SGSN to allocate resources to the terminal, and the message carries security relevant parameters: such as mapped traditional keys IK' and CK'.

After that, the relocation process of the serving gateway (Serving GW) may be carried out simultaneously.

In step 105, if the target SGSN supports the HSPA+ enhanced security function, i.e., if the target SGSN is SGSN+, then this target SGSN+ deduces the intermediate key $K_{RNC}$ according to the received mapped traditional keys IK' and CK'.

The deduction formula of $K_{RNC}$ is shown in embodiment 9.

Alternatively, after deducing the intermediate key $K_{RNC}$, the target SGSN+ deduces the deformation intermediate key $K_{RNC}*$ according to the mapped traditional keys IK' and CK' and the intermediate key $K_{RNC}$, wherein the deformation intermediate key is used for updating the enhanced air interface keys $IK_U$ and $CK_U$ when the terminal carries out the relocation of the SRNC in the enhanced UTRAN network. Preferably, the deformation intermediate key $K_{RNC}*$ is associated with a counter NCC, and the counter NCC is used for recording the number of times of generating the deformation intermediate key; and in this embodiment, the value of the NCC associated with that deformation intermediate key $K_{RNC}*$ is 1 at the moment.

If the target SGSN does not support the HSPA+ enhanced security function, then the following flow will be operated according to the flow specified in the LTE specification, which will not be repeated herein.

In step 106, the target SGSN+ sends a Relocation Request message to the target RNC+ to request the target RNC+ to establish radio network resources for the terminal, and the message carries security relevant information and at least includes $K_{RNC}$ and algorithm information.

The algorithm information includes integrity algorithm information and/or ciphering algorithm information. The integrity algorithm can be an integrity algorithm supported by the terminal or an integrity algorithm selected by the network side; and the ciphering algorithm can be a ciphering algorithm supported by the terminal or a ciphering algorithm selected by the network side. If it is required to carry out the integrity protection, then the algorithm information at least includes the integrity algorithm.

Alternatively, if in step 105, the target SGSN+ also deduces the deformation intermediate key $K_{RNC}*$, then the target SGSN+ can also carries the deformation intermediate key $K_{RNC}*$ in that information. If a counter NCC is set for $K_{RNC}*$, then the value of the counter NCC can also be carried.

In step 107, the target RNC+ allocates radio resources for the terminal, deduces the enhanced air interface integrity key $IK_U$ and/or air interface ciphering key $CK_U$ according to the received $K_{RNC}$, and stores the generated $IK_U$ and/or $CK_U$.

The deduction formulas of $IK_U$ and $CK_U$ are shown in embodiments 10 and 11. If a fresh random number (FRESH) is required to be used during deduction, then the target RNC+ also needs to generate a FRESH parameter.

In step 108, the target RNC+ sends a Relocation Request Acknowledge message to the target SGSN+.

If in step 106, the target SGSN+ carries the algorithm information, then in this step, the RNC+ has to carry the algorithm (integrity algorithm and/or ciphering algorithm) selected by the RNC+ in that Relocation Request Acknowledge message.

In addition, the target RNC+ can add an indication in the Relocation Request Acknowledge message for implicitly or explicitly indicating the terminal to deduce the enhanced keys $IK_U$ and/or $CK_U$; for example, a network side security ability indication (implicitly) or an enhanced key enabled indication (explicitly) is added in the Relocation Request Acknowledge message.

After that, the target SGSN+ and the serving gateway may perform an interaction process of creating an indirect data forward tunnel request message.

In step 109, the target SGSN+ sends a Forward Relocation Response message to the source MME.

If the target SGSN+ receives the algorithm selected by the target RNC+, then that Forward Relocation Response message carries the algorithm selected by RNC+.

The target SGSN+ can also add an indication in the Forward Relocation Response message for implicitly or explicitly indicating the terminal to deduce the enhanced keys $IK_U$ and/or $CK_U$; for example, a network side security ability indication (implicitly) or an enhanced key enabled indication (explicitly) is added and contained in the Forward Relocation Response message. If the target RNC+ carries the indication in step 108, then the target SGSN+ can add that indication into the constructed Forward Relocation Response message.

In step 110, the source MME sends a handover command message to the source base station to indicate the network to complete the handover preparation process.

If the message sent by the target SGSN+ to the source MME carries the algorithm selected by the RNC+, then the handover command message sent by the source MME to the source base station also carries parameters representing the algorithm.

Besides, the source MME carries the indication added by the target RNC+ or the target SGSN+ in the handover command message for indicating the terminal to deduce the enhanced keys $IK_U$ and/or $CK_U$.

In step 111, the source base station sends a Handover from EUTRAN Command message to the terminal to indicate the terminal to switch to a target access network.

That handover command message carries the parameters regarding radio aspect which are allocated to the terminal by the target RNC+ at the preparation stage, and the algorithm information (including integrity algorithm and/or ciphering algorithm).

Preferably, the source base station also carries the indication added by the target RNC+ or the target SGSN+ in that message for indicating the terminal to deduce the enhanced keys $IK_U$ and $CK_U$.

In step 112, the terminal deduces the mapped traditional keys IK' and CK' according to $K_{ASME}$, then deduces $K_{RNC}$ according to the mapped traditional keys IK' and CK', and then deduces the enhanced air interface integrity key $IK_U$ and/or air interface ciphering key $CK_U$ according to the $K_{RNC}$.

In step 113, the terminal sends a handover to UTRAN complete message to the target RNC+, and that message carries out the integrity protection by using the newly generated enhanced integrity key $IK_U$, and/or carries out the ciphering protection by using the enhanced ciphering key $CK_U$.

In step 114, the target RNC+ sends a Relocation Complete message to the target SGSN+, and indicate to the target SGSN+ that the terminal has successfully switched from the EUTRAN to the target RNC+.

In step 115, the target SGSN+ carries out message interaction with the source MME to acknowledge that the relocation is completed.

In step 116, the source MME and the source base station carry out the message interaction to release the relevant resources.

Embodiment 2

Figure 5:
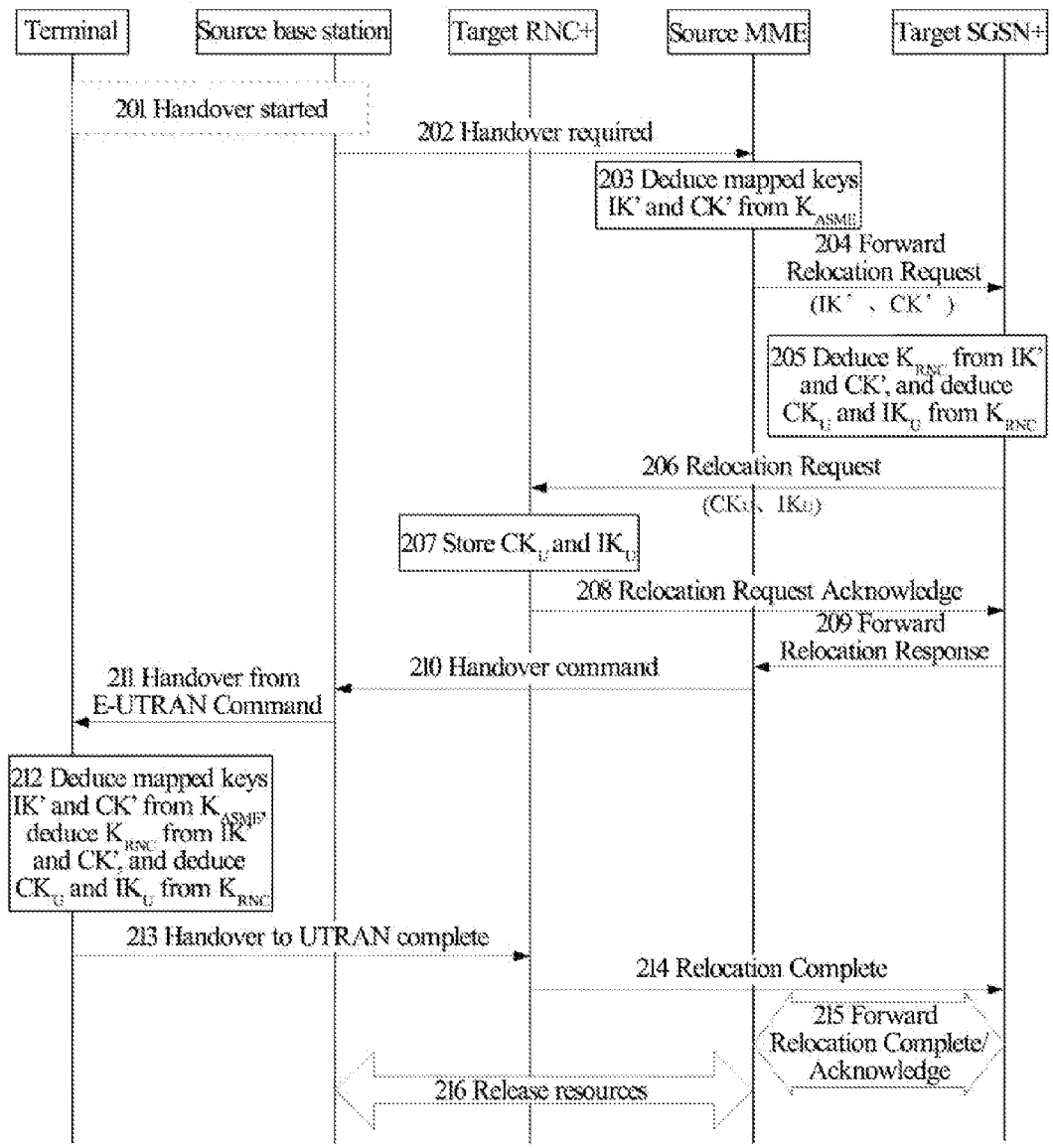
FIG. 5 is a flowchart of an embodiment two of the present invention.

This embodiment describes an example of a flow for establishing an enhanced air interface key when the terminal moves from the EUTRAN to the enhanced UTRAN. The difference between this embodiment and the embodiment 1 is in that: the enhanced air interface integrity key $IK_U$ and air interface ciphering key $CK_U$ are generated at the target SGSN+, and issued to the target RNC+ in the Relocation Request message by the target SGSN+. As shown in FIG. 5, it includes the following steps.

In steps 201-204, they are the same as steps 101-104 in the embodiment 1.

In step 205, if the target SGSN supports the enhanced security function, i.e., if the target SGSN is the SGSN+, then that target SGSN+ deduces $K_{RNC}$ according to the received mapped traditional keys IK' and CK', and further deduces the enhanced air interface integrity key $IK_U$ and/or air interface ciphering key $CK_U$ according to the intermediate key $K_{RNC}$.

Alternatively, the target SGSN+ deduces a deformation intermediate key $K_{RNC}*$ according to the mapped traditional keys IK' and CK' and the intermediate key $K_{RNC}$.

In step 206, the target SGSN+ sends a Relocation Request message to the target RNC+ to request the target RNC+ to establish radio network resources for the terminal, wherein that message carries security relevant information and at least includes: enhanced air interface key information (enhanced air interface integrity key $IK_U$ and/or air interface ciphering key $CK_U$) and algorithm information.

The algorithm information includes the integrity algorithm information and/or the ciphering algorithm information.

Alternatively, if in step 205, the target SGSN+ also deduces the deformation intermediate key $K_{RNC}*$, then the target SGSN+ also carries the deformation intermediate key $K_{RNC}*$ in that information. If a counter NCC is set for $K_{RNC}*$, then the value of the counter NCC can also be carried.

In step 207, the target RNC+ stores the enhanced air interface key information.

In steps 208-216, they are the same as steps 108-116 in the embodiment 1.

Embodiment 3

Figure 6:
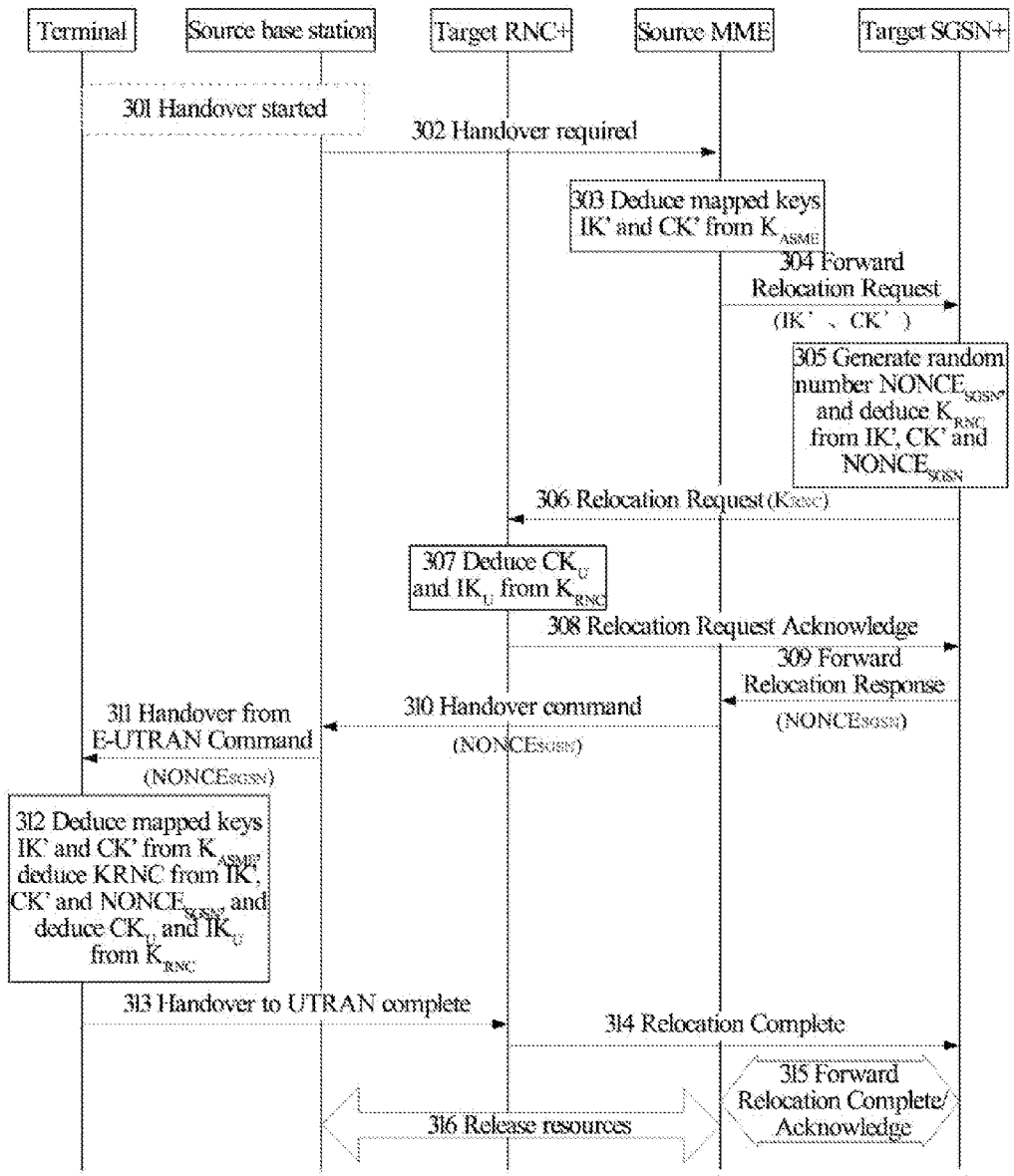
FIG. 6 is a flowchart of an embodiment three of the present invention.

This embodiment describes another example of a flow for establishing an enhanced air interface key when the terminal moves from the EUTRAN to the enhanced UTRAN. The difference between this embodiment and the embodiment 1 is in that, the target SGSN+ generates a random number $NONCE_{SGSN}$, and deduces the intermediate key $K_{RNC}$ by using that random number $NONCE_{SGSN}$ and the mapped traditional keys IK' and CK'. As shown in FIG. 6, it includes the following steps.

In steps 301-304, they are the same as steps 101-104 in the embodiment 1.

In step 305, if the target SGSN is the SGSN+, then the target SGSN+ generates a random number $NONCE_{SGSN}$, and deduces $K_{RNC}$ according to the received mapped traditional keys IK' and CK' and the generated random number $NONCE_{SGSN}$.

The deduction formula of $K_{RNC}$ is shown in the embodiment 9.

Alternatively, after deducing the intermediate key $K_{RNC}$, the target SGSN+ deduces the deformation intermediate key $K_{RNC}*$ according to the mapped traditional keys IK' and CK' and the intermediate key $K_{RNC}$, wherein the deformation intermediate key is used for updating the enhanced air interface keys $IK_U$ and $CK_U$ when the terminal carries out the relocation of the SRNC in the enhanced UTRAN network. Preferably, the deformation intermediate key $K_{RNC}*$ is associated with a counter NCC. In this embodiment, the value of the NCC associated with that deformation intermediate key $K_{RNC}*$ is 1 at the moment.

In steps 306-308, they are the same as steps 106-108 in the embodiment 1.

In step 309, the target SGSN+ sends a Forward Relocation Response message to the source MME and carries the following parameters in that message: the random number $NONCE_{SGSN}$ and the algorithm information, and the algorithm information includes the integrity algorithm information and/or the ciphering algorithm information.

Preferably, the target SGSN+ can carry an indication in that message, and midway forwards by way of the source MME to indicate the terminal to deduce the enhanced keys $IK_U$ and $CK_U$, which can be indicated implicitly or explicitly; for example, a network side security ability indication (implicitly) or an enhanced key enabled indication (explicitly) is added and contained in the Forward Relocation Response message.

In step 310, the source MME sends a handover command message to the source base station to indicate the network to complete the handover preparation process, and carries the following parameters in that message: the random number $NONCE_{SGSN}$ and the algorithm information.

In step 311, the source base station sends a Handover from EUTRAN Command message to the terminal to indicate the terminal to switch to the target access network, and carries parameters regarding radio aspects allocated to the terminal by the target RNC+ at the preparation stage in that message, wherein the parameters include the random number $NONCE_{SGSN}$ and the algorithm information.

Preferably, the source base station in that message indicates the terminal to deduce the enhanced keys $IK_U$ and $CK_U$, which can be indicated implicitly or explicitly; for example, the network side security ability indication (implicitly) or the enhanced key enabled indication (explicitly) is added and contained in the handover command.

In step 312, the terminal deduces the mapped traditional keys IK' and CK' according to $K_{ASME}$, then deduces $K_{RNC}$ according to the mapped traditional keys IK' and CK' and the random number $NONCE_{SGSN}$, and then deduces the enhanced air interface integrity key $IK_U$ and/or air interface ciphering key $CK_U$ according to $K_{RNC}$.

In steps 313-316, they are the same as steps 113-116 in the embodiment 1.

Embodiment 4

Figure 7:
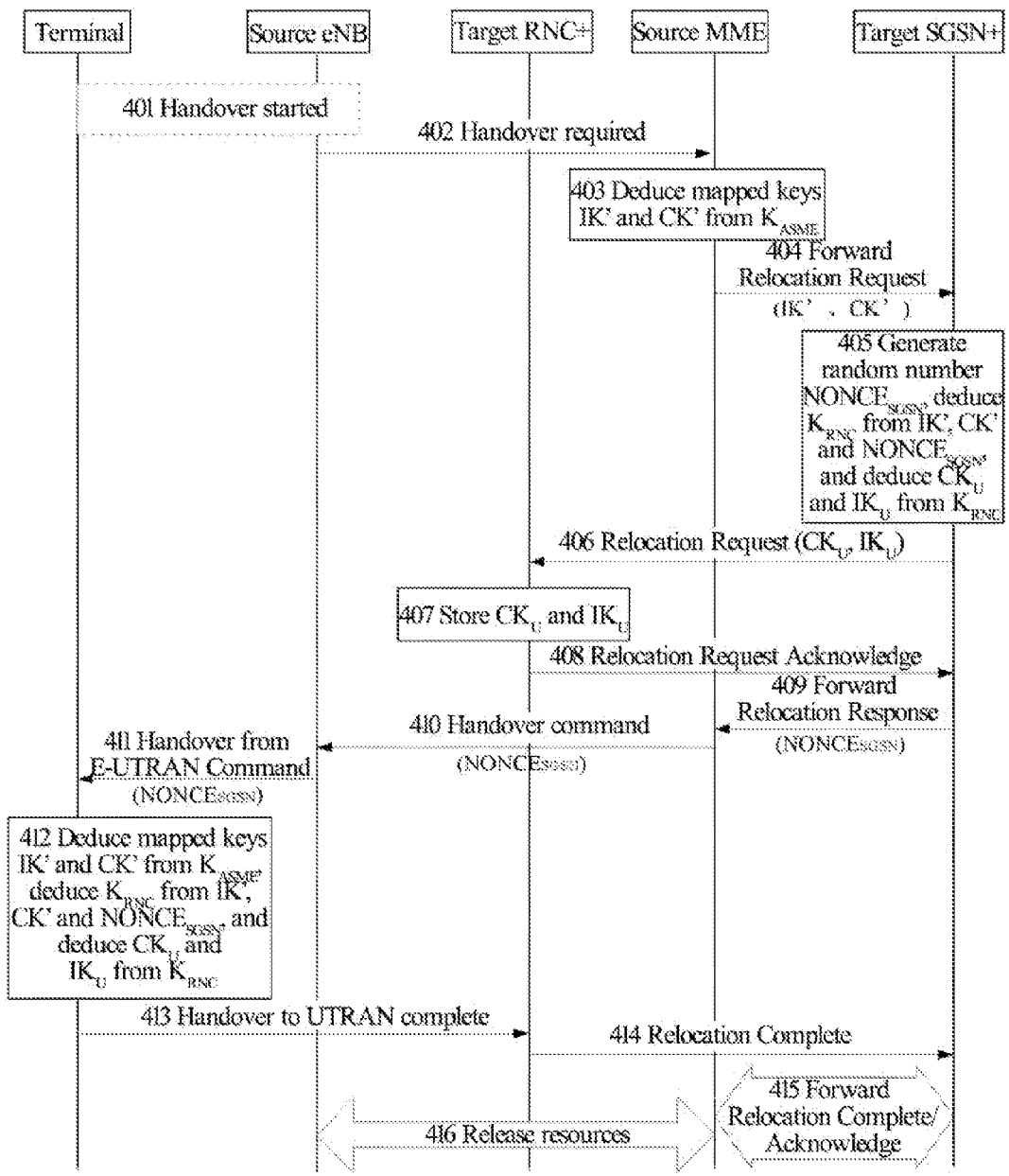
FIG. 7 is a flowchart of an embodiment four of the present invention.

This embodiment describes an example of a flow for establishing an enhanced air interface key when the terminal moves from the EUTRAN to the enhanced UTRAN. The difference between this embodiment and the embodiment 3 is in that: the enhanced air interface integrity key $IK_U$ and air interface ciphering key $CK_U$ are generated at the target SGSN+, and issued to the target RNC+ in the Relocation Request message by the target SGSN+. As shown in FIG. 7, it includes the following steps.

In steps 401-404, they are the same as steps 301-304 in the embodiment 3.

In step 405, if the target SGSN is SGSN+, then the target SGSN+ generates the random number $NONCE_{SGSN}$, deduces $K_{RNC}$ according to the received mapped traditional keys IK' and CK' and the generated random number $NONCE_{SGSN}$, and then deduces the enhanced air interface integrity key $IK_U$ and/or air interface ciphering key $CK_U$ according to the intermediate key $K_{RNC}$; or, the target SGSN+ deduces $K_{RNC}$ according to the received mapped traditional keys IK' and CK', and then deduces the enhanced air interface integrity key $IK_U$ and/or air interface ciphering key $CK_U$ according to the intermediate key $K_{RNC}$ and the generated random number $NONCE_{SGSN}$.

Alternatively, the target SGSN+ deduces the deformation intermediate key $K_{RNC}^*$ according to the mapped traditional keys IK' and CK' and the intermediate key $K_{RNC}$, and setting a counter NCC for that deformation intermediate key $K_{RNC}^*$.

In step 406, the target SGSN+ sends a Relocation Request message to the target RNC+ to request the target RNC+ to establish radio network resources for the terminal, wherein that message carries security relevant information including at least: the enhanced air interface key information (enhanced air interface integrity key $IK_U$ and/or air interface ciphering key $CK_U$) and the algorithm information.

The algorithm information includes the integrity algorithm information and/or the ciphering algorithm information.

Alternatively, if in step 405, the target SGSN+ also deduces the deformation intermediate key $K_{RNC}^*$, then the target SGSN+ also carries the deformation intermediate key $K_{RNC}^*$ in that information. If a counter NCC is set for $K_{RNC}^*$, then the value of the counter NCC can also be carried.

In step 407, the target RNC+ stores the enhanced air interface key information.

In steps 408-416, they are the same as steps 308-316 in the embodiment 3. In step 412, the terminal deduces the enhanced key $IK_U$ and/or $CK_U$ according to the same method as that of the network side.

Embodiment 5

Figure 8:
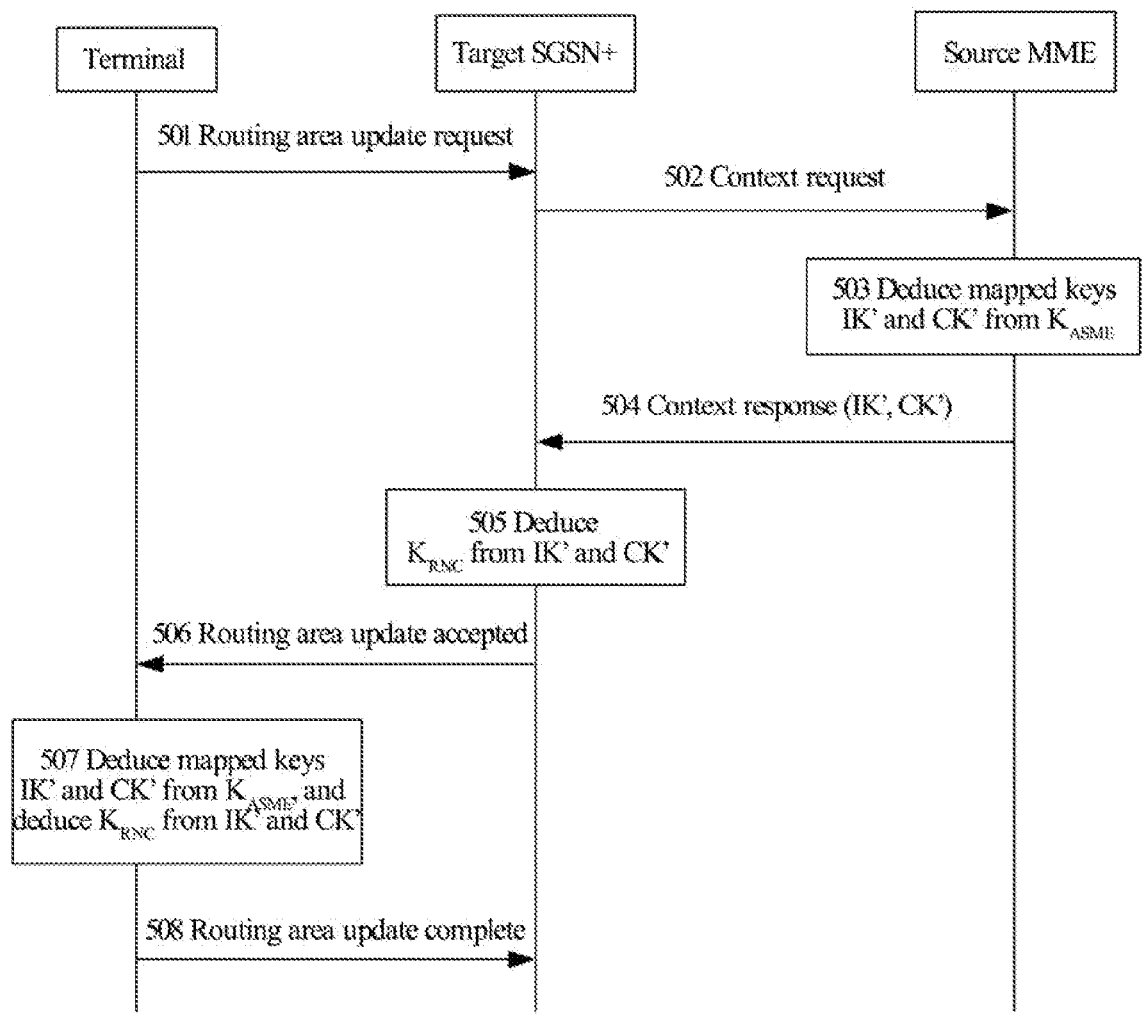
FIG. 8 is a flowchart of an embodiment five of the present invention.

This embodiment shows an example of establishing an enhanced air interface key when the terminal moves from the EUTRAN to the enhanced UTRAN in the idle mode to carry out routing area update, and as shown in FIG. 8, it includes the following steps.

In step 501, when the triggering condition of the routing area update is met, the terminal sends a routing area update request message to the target SGSN+ to request to carry out the routing area update, wherein the message carriers NAS token (non-access stratum token) for the network verifying the terminal.

The deduction formula of the NAS token follows the definition of LTE relevant protocol, which will not be repeated herein.

In step 502, the target SGSN+ sends a context request message to the source MME of that terminal to request the context of that terminal, wherein that message carries parameter NAS token.

In step 503, the source MME verifies the NAS token, if the verification is passed, then the source MME deduces the mapped traditional keys IK' and CK' according to $K_{ASME}$.

The deduction formula of the mapped traditional keys IK' and CK' follows the LTE relevant protocol definition, which will not be repeated herein.

In step 504, the source MME sends a context response message to the target SGSN+, and that message carries parameters: the mapped traditional keys IK' and CK'.

In step 505, the target SGSN+ deduces $K_{RNC}$ according to the received mapped traditional keys IK' and CK'.

The deduction formula of $K_{RNC}$ is shown in the embodiment 9.

In step 506, the target SGSN+ sends a routing area update accepted message to the terminal.

Preferably, the target SGSN+ adds an indication in the routing area update accepted message for implicitly or explicitly indicating the terminal to deduce $K_{RNC}$; for example, a network side security ability indication (implicitly) or an enhanced key enabled indication (explicitly) is added and contained in the routing area update accepted message.

In step 507, the terminal deduces the mapped traditional keys IK' and CK' according to $K_{ASME}$, and then deduces $K_{RNC}$ from the mapped traditional keys IK' and CK'; wherein, the deduction of the mapped traditional keys IK' and CK' can also happen before this step.

Since the terminal is in the idle state, it is only required to deduce the intermediate key $K_{RNC}$ and store the $K_{RNC}$.

In step 508, the terminal sends a routing area update complete message to the target SGSN+ to confirm that the routing area update is completed.

Embodiment 6

Figure 9:
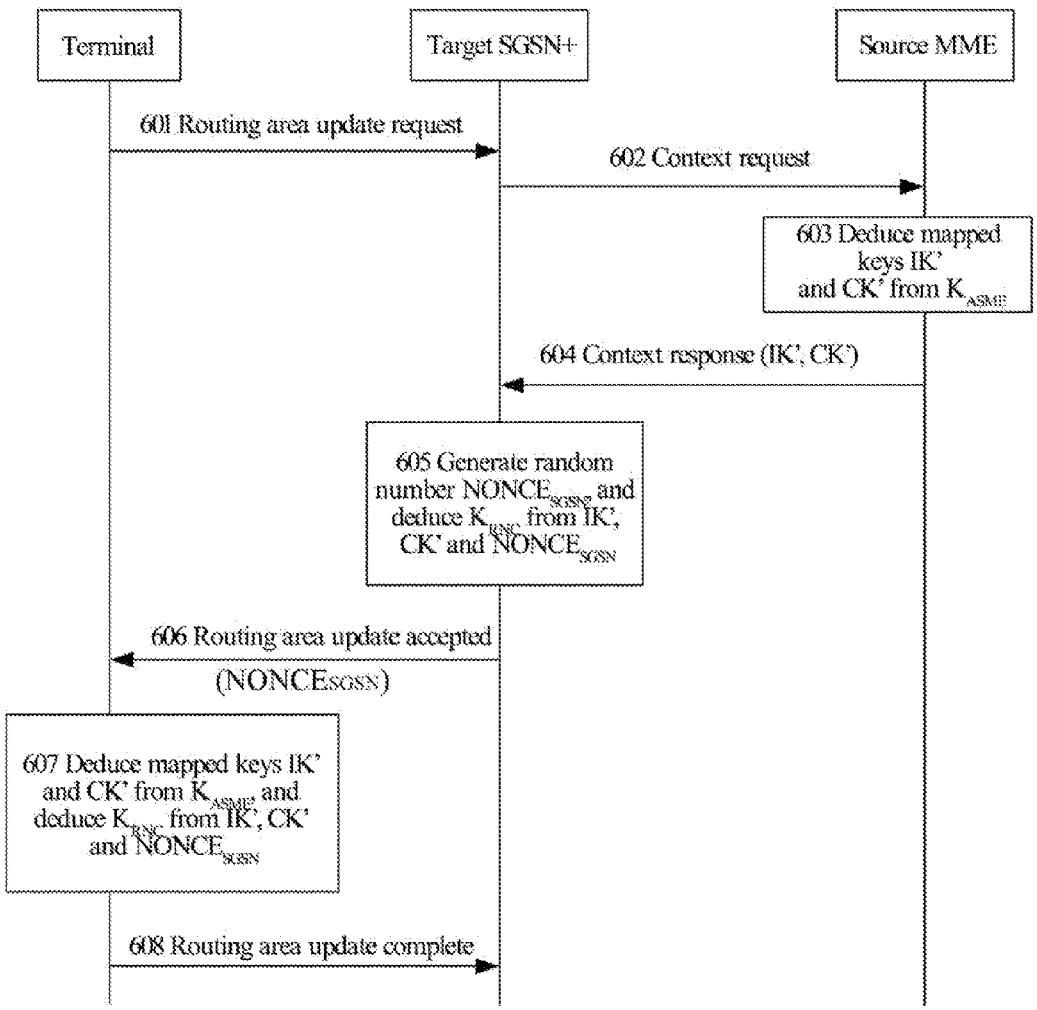
FIG. 9 is a flowchart of an embodiment six of the present invention.

This embodiment shows an example of establishing an enhanced air interface key when the terminal moves from the EUTRAN to the enhanced UTRAN in the idle mode to carry out the routing area update. The difference between this embodiment and the embodiment 5 is in that, the target SGSN+ generates a random number $NONCE_{SGSN}$, and the target SGSN+ and the terminal deduce the intermediate key $K_{RNC}$ by using that random number $NONCE_{SGSN}$ and the mapped traditional keys IK' and CK'. As shown in FIG. 9, it includes the following steps.

In steps 601-604, they are the same as steps 501-504 in the embodiment 5.

In step 605, the target SGSN+ generates the random number $NONCE_{SGSN}$, and deduces $K_{RNC}$ according to the received mapped traditional keys IK' and CK' and the random number $NONCE_{SGSN}$.

The deduction formula of $K_{RNC}$ is shown in the embodiment 9.

In step 606, the target SGSN+ sends a routing area update accepted message to the terminal and carries the parameter: random number $NONCE_{sGsN}$ in the message.

Preferably, the target SGSN+ adds an indication in the routing area update accepted message for implicitly or explicitly indicating the terminal to deduce $K_{RNC}$.

In step 607, the terminal deduces the mapped traditional keys IK' and CK' according to $K_{ASME}$, and then deduces $K_{RNC}$ according to the mapped traditional keys IK' and CK' and the $NONCE_{SGSN}$; wherein, the deduction of the mapped traditional keys IK' and CK' can also happen before this step.

In steps 608, it is the same as step 508 in the embodiment 5.

Embodiment 7

Figure 10:
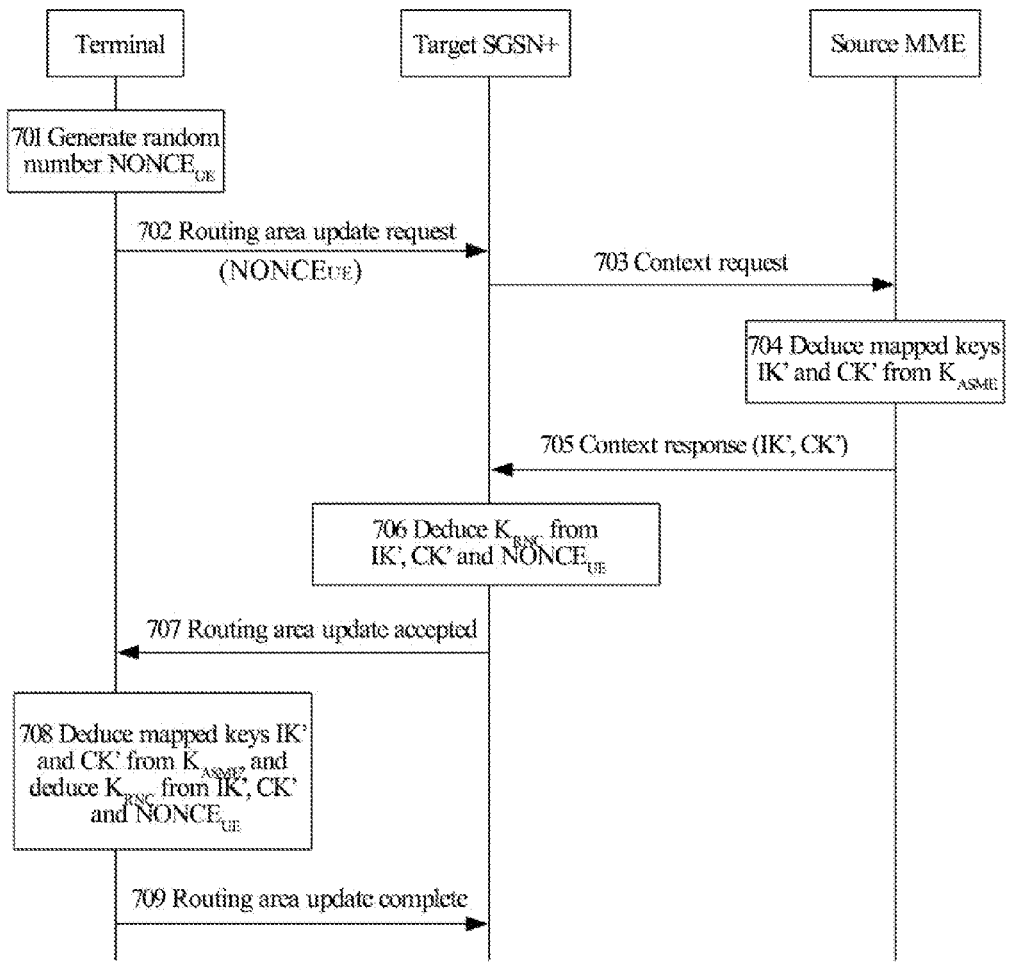
FIG. 10 is a flowchart of an embodiment seven of the present invention.

This embodiment shows an example of establishing an enhanced air interface key when the terminal moves from the EUTRAN to the enhanced UTRAN in the idle mode to carry out the routing area update. The difference between this embodiment and the embodiment 5 is in that, a random number $NONCE_{UE}$ is generated by the terminal, and the target SGSN+ and the terminal deduce the intermediate key $K_{RNC}$ by using that random number $NONCE_{UE}$ and the mapped traditional keys IK' and CK'. As shown in FIG. 10, it includes the following steps.

In step 701, when the triggering condition of the routing area update is met, the terminal generates a random number $NONCE_{UE}$.

In step 702, the terminal sends a routing area update request message to the target SGSN+ to request to carry out the routing area update, wherein that message carries the parameter: random number $NONCE_{UE}$.

In addition, that message further carries the NAS token for the network verifying the terminal. The deduction formula of the NAS token follows the definition of LTE relevant protocol, which will not be repeated herein.

In steps 703-705, they are the same as steps 502-504 in the embodiment 5.

In step 706, the target SGSN+ deduces $K_{RNC}$ according to the received mapped traditional keys IK' and CK' and the random number $NONCE_{UE}$.

The deduction formula of $K_{RNC}$ is shown in the embodiment 9.

In step 707, it is the same as step 506 in the embodiment 5.

In step 708, the terminal deduces the mapped traditional keys IK' and CK' according to $K_{ASME}$, and then deduces $K_{RNC}$ according to the mapped traditional keys IK' and CK' and $NONCE_{UE}$; wherein, the deduction of the mapped traditional keys IK' and CK' can also happen before this step.

In step 709, it is the same as step 508 in the embodiment 5.

Embodiment 8

Figure 11:
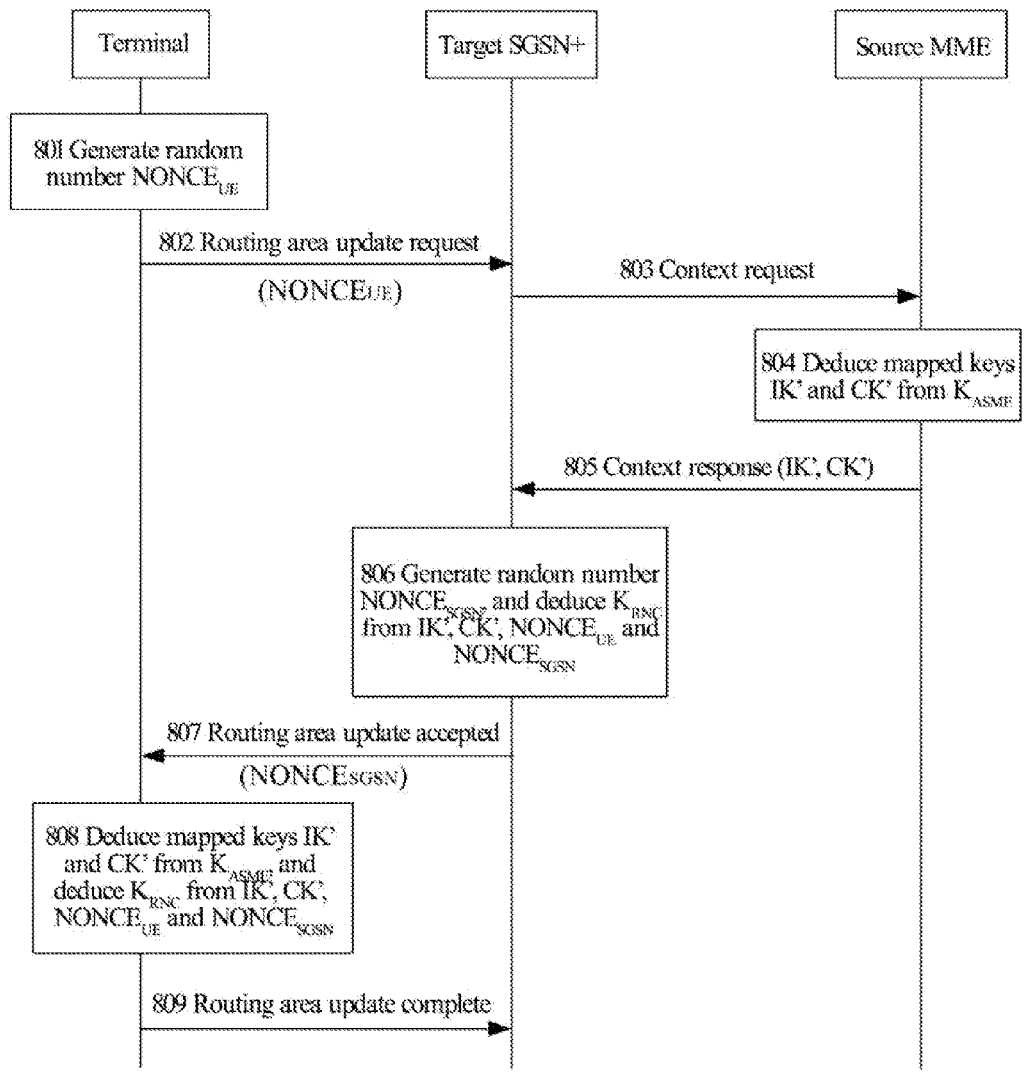
FIG. 11 is a flowchart of an embodiment eight of the present invention.

This embodiment shows an example of establishing an enhanced air interface key when the terminal moves from the EUTRAN to the enhanced UTRAN in the idle mode to carry out the routing area update. The difference between this embodiment and the embodiment 5 is in that, in this embodiment, the terminal generates a random number $NONCE_{UE}$, the target SGSN+ generates a random number $NONCE_{SGSN}$, the terminal and the target SGSN+ deduce the intermediate key $K_{RNC}$ by using the random number $NONCE_{UE}$, the random number $NONCE_{SGSN}$ respectively and the mapped traditional keys IK' and CK'. As shown in FIG. 11, it includes the following steps.

In step 801, when the triggering condition of the routing area update is met, the terminal generates a random number $NONCE_{UE}$.

In step 802, the terminal sends a routing area update request message to the target SGSN+ to request to carry out the routing area update, and that message carries the parameter: random number $NONCE_{UE}$, and at the same time, that message also carriers the NAS token for the network verifying the terminal.

The deduction formula of the NAS token follows the definition of LTE relevant protocol, which will not be repeated herein.

In steps 803-805, they are the same as steps 502-504 in the embodiment 5.

In step 806, the target SGSN+ generates the random number $NONCE_{SGSN}$, and deduces $K_{RNC}$ according to the received mapped traditional keys IK' and CK', the random number $NONCE_{UE}$ and the random number $NONCE_{SGSN}$.

The deduction formula of $K_{RNC}$ is shown in the embodiment 9.

In step 807, the target SGSN+ sends a routing area update accepted message to the terminal and carries the following parameter in the message: random number $NONCE_{SGSN}$.

Preferably, the target SGSN+ adds an indication in the routing area update accepted message for implicitly or explicitly indicating the terminal to deduce $K_{RNC}$.

In step 808, the terminal deduces the mapped traditional keys IK' and CK' according to $K_{ASME}$, and then deduces $K_{RNC}$ in combination with random number $NONCE_{UE}$ and the random number $NONCE_{SGSN}$, wherein, the deduction of the mapped traditional keys IK' and CK' can also happen before this step.

In step 809, it is the same as step 508 in the embodiment 5.

Embodiment 9

This embodiment gives an example of the deduction formula of the intermediate key $K_{RNC}$.

In addition to including the mapped traditional ciphering key CK' and the mapped traditional integrity key IK', generation parameters for the SGSN+ deriving the intermediate key $K_{RNC}$ further includes one of or a combination of any number of the following parameters: a Public Land Mobile Network identifier (PLMN identifier), a core network node type (TYPE, which represents the packet switching or the circuit switching), a sequence number (SQN), an anonymity key (AK), a user identifier (such as, IMSI, IMEI or TMSI), and a random number NONCE; wherein, the sequence number and the anonymity key are parameters respectively generated by the user and the home subscriber server in the processes of the authentication and key agreement.

Several examples of deriving $K_{RNC}$ are given below, wherein, the arrangement of the parameters in the bracket has no order, and a plurality of parameters therein can be connected in the form of "||" (cascade):

$K_{RNC}=F1(CK',IK',Type,SQN \oplus AK);$ or, $K_{RNC}=F1(CK',IK',PLMN\ identifier,SQN \oplus AK);$ Or, $K_{RNC}=F1(CK',IK',PLMN\ identifier,Type, SQN \oplus AK);$ or, $K_{RNC}=F1(CK',IK',IMSI,SQN \oplus AK);$ Or, $K_{RNC}=F1(CK',IK',Type,IMSI,SQN \oplus AK);$ or, $K_{RNC}=F1(CK',IK',PLMN\ identifier,Type,IMSI, SQN \oplus AK);$ Or, $K_{RNC}=F1(CK',IK',PLMN\ identifier,SQN \oplus AK);$ or, $K_{RNC}=F1(CK',IK',PLMN\ identifier,SQN);$ Or, $K_{RNC}=F1(CK',IK',PLMN\ identifier,AK);$ or, $K_{RNC}=F1(CK',IK',SQN \oplus AK);$ Or, $K_{RNC}=F1(CK',IK',TYPE,AK);$ or, $K_{RNC}=F1(CK',IK',NONCE_{SGSN});$ Or, $K_{RNC}=F1(CK',IK',NONCE_{UE})$;

or, $K_{RNC}=F1(CK',IK',NONCE_{SGSN},NONCE_{UE})$;

wherein, F1 is any key generation algorithm, for example, it can be a KDF algorithm defined by 3GPP. "⊕" represents an XOR algorithm according to the 3GPP definition.

Alternatively, if the target SGSN+ cannot obtain the value of SQN⊕AK, then the value can be initialized as 0 or a certain particular value.

Embodiment 10

This embodiment gives an example of the deduction formula of the enhanced air interface integrity key $IK_U$ and air interface ciphering key $CK_U$.

The core network node SGSN+ sends the intermediate key $K_{RNC}$ to the RNC+, the RNC+ calculates the ciphering key $CK_U$ and the integrity key $IK_U$ according to the intermediate key $K_{RNC}$ and the existing parameter in the universal mobile communication system network, and both the target SGSN+ and the terminal can calculate $CK_U$ and $IK_U$ in combination with the following existing parameter in the UMTS network.

The existing parameter in the UMTS network comprises one of or a combination of any number of the following parameters: a fresh random number (FRESH) generated by the RNC+, an encryption algorithm identifier (enc-alg-ID), an integrity algorithm identifier (int-alg-ID), a physical cell identifier (PCI) of an enhanced node B, a UMTS absolute radio frequency channel number (UARFCN) of the enhanced node B, a scrambling code allocated to the user equipment by the RNC+, a user identifier, an RNC+ identifier, a start (START) parameter defined in a universal mobile communication system, an integrity sequence number (COUNT-I) parameter defined in the universal mobile communication system, and a radio resource control sequence number (RRC SN) parameter defined in the universal mobile communication system.

Several examples of deriving the ciphering key $CK_U$ and the integrity key $IK_U$ are given below, wherein the arrangement of the parameters in the bracket has no order, and a plurality of parameters therein can be connected in the form of "||".

$CK_U=F2(K_{RNC},FRESH,\text{enc-alg-ID})$, and $IK_U=F3(K_{RNC},FRESH,\text{int-alg-ID})$;

or, $(CK_U,IK_U)=F2(K_{RNC},FRESH)$;

or, $(CK_U,IK_U)=F2(K_{RNC},PCI,UARFCN)$;

or, $(CK_U,IK_U)=F2(K_{RNC},PCI,UARFCN,\text{Scrambling Code})$;

or, $CK_U=F2(K_{RNC},PCI,UARFCN,\text{enc-alg-ID})$, and $IK_U=F2(K_{RNC},PCI,UARFCN,\text{int-alg-ID})$;

or, $CK_U=F2(K_{RNC},START,\text{enc-alg-ID})$, and $IK_U=F2(K_{RNC},START,\text{int-alg-ID})$;

or, $CK_U=F2(K_{RNC},COUNT\text{-}I,\text{enc-alg-ID})$, and $IK_U=F2(K_{RNC},COUNT\text{-}I,\text{int-alg-ID})$;

or, $CK_U=F2(K_{RNC},RRC\ SN,\text{enc-alg-ID})$, and $IK_U=F2(K_{RNC},RRC\ SN,\text{int-alg-ID})$;

or, $(CK_U,IK_U)=F2(K_{RNC},NONCE)$; herein NONCE can be a random number generated by the SGSN+.

Where, F is any key generation algorithm, such as: a KDF algorithm defined by 3GPP.

The random number FRESH is one parameter already defined in the UMTS. The length of that random number is 32-bit. When the connection is established, the RNC (i.e., Node B+ when corresponding into HSPA+) generates a random number FRESH for each user, and issues the FRESH to the user through a security mode command message. Within the duration of entire connection, the network and the user use that random number to calculate a message verification code (MAC-I), for protecting the network from replay attack of the user signaling message. When the terminal switches from the EUTRAN to the UTRAN, the target RNC+ generates that FRESH parameter after receiving the Relocation Request message sent by the target SGSN+. The FRESH parameter is sent to the terminal by way of the midway forwarding of the target SGSN+, the source MME and the source base station (i.e., steps 108-111 in the embodiment 1). The terminal calculates $CK_U$ and $IK_U$ by using that parameter.

The start parameter (START) is a parameter already defined in the UMTS, and is stored in the user equipment (UE) and the Universal Subscriber Identity Module (abbreviated as USIM) for managing the life cycles of the ciphering key and the integrity key, and the value of START associated with the newly generated key is initialized as 0 in the ME and the USIM during a successful authentication and key agreement process. When a wireless connection is established, the user equipment sends the value of the start parameter to the radio network controller (RNC) through a radio link control connection establishment complete message; and in the process of maintaining the wireless connection, the user equipment and the radio network controller increases the start parameter value by degrees according to a network rule. When the value of the START reaches a specified threshold value, the key will be invalid.

The length of the integrity sequence number (COUNT-I) is 32-bit, and consists of 4-bit RRC sequence number (RRC SN) and 28-bit superframe number. The superframe number increases by degrees within each RRC SN cycle, and the RRC sequence number (RRC SN) increases by degrees in each radio link control message of integrity protection.

The physical cell identifier (PCI) and the absolute frequency point of the enhanced node B are broadcasted in a system broadcast message of the enhanced node B. The scrambling code allocated to the user equipment by the enhanced node B is obtained from the network side before the user establishes the wireless connection with the network.

Embodiment 11

This embodiment gives an example of another deduction of the enhanced air interface integrity key $IK_U$ and air interface ciphering key $CK_U$.

After the target SGSN+ receives the mapped traditional keys IK' and CK' sent by the source MME, the target SGSN+ makes the enhanced air interface keys $IK_U$=IK', $CK_U$=CK'; and during the flow of routing area update, the target SGSN+ makes the enhanced intermediate key $K_{RNC}$=(IK'||CK');

after the terminal has deduced the mapped traditional keys IK' and CK', the terminal makes $IK_U$=IK', $CK_U$=CK'. During the flow of routing area update, the terminal makes the enhanced intermediate key $K_{RNC}$=(IK'||CK').

The system implementing the above method includes a terminal, an enhanced serving GPRS support node (SGSN+) in the enhanced UTRAN, wherein:

the SGSN+ is configured to: when the terminal moves from the EUTRAN to the enhanced UTRAN, deduce an intermediate key used in the UTRAN according to a mapped traditional key obtained from a source mobility management entity (MME); and the terminal is configured to: deduce the mapped traditional key, and, after deducing and obtaining the mapped traditional key, further deduce the intermediate key used in the enhanced UTRAN by using an algorithm which is the same as that of the SGSN+ according to the mapped traditional key.

Preferably:

the system further comprises a target enhanced radio network controller (RNC+) in the enhanced UTRAN, wherein the SGSN+ comprises: a first receiving unit, a first key deduction unit and a first sending unit, wherein:

the first receiving unit is configured to: receive the mapped traditional key sent by the source mobility management entity;

the first key deduction unit is configured to: deduce the intermediate key according to the mapped traditional key; and the first sending unit is configured to: send the deduced intermediate key to the RNC+;

the RNC+ is configured to: deduce an enhanced air interface integrity key ($IK_U$) and/or an enhanced air interface ciphering key ($CK_U$) according to the intermediate key;

the terminal comprises: a second receiving unit and a second key deduction unit, wherein:

the second receiving unit is configured to: receive a command sent by a network side; and the second key deduction unit is configured to: deduce the mapped traditional key according to the command, deduce the intermediate key by using the algorithm which is the same as that of the SGSN+ according to the mapped traditional key obtained by deducing, and deduce an enhanced air interface key by using an algorithm which is the same as that of the RNC+ according to the intermediate key.

Preferably:

the system further comprises a target enhanced radio network controller (RNC+) in the enhanced UTRAN, wherein the SGSN+ comprises: a first receiving unit, a first key deduction unit and a first sending unit, wherein:

the first receiving unit is configured to: receive the mapped traditional key sent by the source mobility management entity;

the first key deduction unit is configured to: deduce the intermediate key according to the mapped traditional key, and deduce an enhanced air interface integrity key ($IK_U$) and/or an enhanced air interface ciphering key ($CK_U$) according to the intermediate key; and the first sending unit is configured to: send the deduced enhanced air interface key to the RNC+;

the RNC+ is configured to: store the received enhanced air interface key;

the terminal comprises: a second receiving unit and a second key deduction unit, wherein:

the second receiving unit is configured to: receive a command sent by a network side; and the second key deduction unit is configured to: deduce the mapped traditional key according to the command, deduce the intermediate key by using the algorithm which is the same as that of the SGSN+ according to the mapped traditional key obtained by deducing, and deduce an enhanced air interface key by using an algorithm which is the same as the SGSN+ according to the intermediate key.

Preferably:

the key deduction unit of the SGSN+ is further configured to: deduce a deformation intermediate key according to the mapped traditional key and the intermediate key, and send the deformation intermediate key to the target RNC+, wherein the deformation intermediate key is adapted for updating the enhanced air interface key when the terminal carries out relocation of a service radio network controller (SRNC) in the enhanced UTRAN network.

The functions of the above various units can be learnt by reference to the foregoing method, for example, the sending unit of the SGSN can also be used to send parameters used when deducing the key to the terminal, and the sending unit of the terminal can further be used to send a random number generated by the terminal to the SGSN+, so that the SGSN+ deduces the key, which will not be repeated herein.

Those skilled in the art can understand that all of or part of the steps in the above method can be completed by instructing relevant hardware by programs, and the programs can be stored in a computer readable storage medium, such as a read only memory, a magnetic disk, or an optical disk, etc. Optionally, all of or part of the steps of the above embodiments can also be implemented by using one or more integrated circuits. Accordingly, the respective module/unit in the above embodiments can be implemented by adopting hardware or software function module. The present invention is not limited to any particular form of combination of hardware and software.

The above description is merely preferred embodiments of the present invention. The solution of the present invention is not limited to the HSPA+ system, its relevant modes can be applied to other wireless communication systems. For those skilled in the art, the present invention can have various changes and variations. Any modification, equivalent and improvement within the spirit and principle of the present invention should be comprised in the protection scope of the present invention.

INDUSTRIAL APPLICABILITY

With the method in the present invention, when the terminal moves from the E-UTRAN to the enhanced UTRAN, the network side and the terminal can respectively establish an enhanced key system according to the mapped traditional keys without repeating the AKA process, thereby saving network overhead, improving system efficiency, and ensuring the secure communication between the terminal and the enhanced UTRAN network.

What we claim is:

1. A method for establishing an enhanced key when a terminal moves from an evolved universal terrestrial radio access network (EUTRAN) to an enhanced universal terrestrial radio access network (UTRAN), comprising:

when the terminal moves from the EUTRAN to the enhanced UTRAN, a target enhanced serving general packet radio service support node (SGSN+) in the enhanced UTRAN deducing an intermediate key used in the enhanced UTRAN according to a mapped traditional key obtained from a source mobility management entity; and the terminal, after deducing the mapped traditional key, further deducing the intermediate key used in the enhanced UTRAN by using an algorithm which is the same as that of the target SGSN+ according to the mapped traditional key;

wherein the enhanced UTRAN supports high speed packet access evolution (HSPA+) security function.

2. The method as claimed in claim 1, further comprising:
when the terminal is in an activated state, the target SGSN+, after deducing the intermediate key, sending the intermediate key to a target enhanced radio network controller (RNC+) in the enhanced UTRAN, and the target RNC+ deducing an enhanced air interface integrity key ($IK_U$) and/or an enhanced air interface ciphering key ($CK_U$) according to the intermediate key; and the terminal, after deducing the intermediate key, further deducing an enhanced air interface key by using an algorithm which is the same as that of the target RNC+ according to the intermediate key;

or, when the terminal is in an activated state, the target SGSN+, after deducing the intermediate key, further deducing an enhanced air interface integrity key ($IK_U$) and/or an enhanced air interface ciphering key ($CK_U$) according to the intermediate key, and sending the deduced enhanced air interface key to a target enhanced radio network controller (RNC+); and the terminal, after deducing the intermediate key, further deducing an enhanced air interface key by using an algorithm which is the same as that of the target SGSN+ according to the intermediate key.

3. The method as claimed in claim 2, further comprising:
the target SGSN+ deducing a deformation intermediate key according to the mapped traditional key and the intermediate key, and sending the deformation intermediate key to the target RNC+, wherein the deformation intermediate key is adapted for updating the enhanced air interface key when the terminal carries out relocation of a service radio network controller (SRNC) in the enhanced UTRAN network.

4. The method as claimed in claim 3, further comprising:
the target SGSN+ setting an associated counter for the deformation intermediate key while deducing the deformation intermediate key, wherein the counter is adapted for recording the number of times of generating the deformation intermediate key.

5. The method as claimed in claim 4, further comprising:
the target SGSN+ sending a value of the counter with the deformation intermediate key together to the target RNC+.

6. The method as claimed in claim 2, wherein,
the message of the target SGSN+ sending the key to the target RNC+ is a Relocation Request message.

7. The method as claimed in claim 2, wherein,
the algorithm for deducing the enhanced air interface key is:
the enhanced air interface integrity key ($IK_U$)=a mapped traditional integrity key (IK'); and
the enhanced air interface ciphering key ($CK_U$)=a mapped traditional ciphering key (CK').

8. The method as claimed in claim 2, wherein,
the step of the target SGSN+ deducing the intermediate key used in the UTRAN according to the mapped traditional key obtained from the source mobility management entity comprises: deducing the intermediate key used in the enhanced UTRAN according to the mapped traditional key and further in combination with a first parameter;
the step of the terminal deducing the intermediate key used in the enhanced UTRAN by using the algorithm which is the same as that of the target SGSN+ according to the mapped traditional key comprises: deducing the intermediate key used in the enhanced UTRAN by using the algorithm which is the same as that of the target SGSN+, similarly according to the mapped traditional key and further in combination with the first parameter; and
the first parameter is sent to the terminal by the target SGSN+, or agreed with the terminal by the target SGSN+;

or, in the process of deducing the enhanced air interface key according to the intermediate key, the enhanced air interface key is deduced according to the intermediate key and further in combination with a second parameter.

9. The method as claimed in claim 8, wherein,
the first parameter comprises one or more of the following parameters: a Public Land Mobile Network identifier (PLMN identifier), a core network node type, a sequence number (SQN), an Anonymity Key (AK), a user identifier and a random number generated by the target SGSN+;

or, the second parameter comprises one or more of the following parameters: a fresh random number (FRESH) generated by a target radio network controller (RNC), an encryption algorithm identifier (enc-alg-ID), an integrity algorithm identifier (int-alg-ID), a physical cell identifier (PCI) of an enhanced node B, an absolute frequency point (UARFCN) of the enhanced node B, a scrambling code allocated to the terminal by the target RNC, a user identifier, a target RNC identifier, a start (START) parameter defined in a universal mobile communication system, an integrity sequence number (COUNT-I) parameter defined in the universal mobile communication system, a radio resource control sequence number (RRC SN) parameter defined in the universal mobile communication system, and a random number generated by the target SGSN+.

10. The method as claimed in claim 9, wherein,
the random number generated by the target SGSN+ is sent to the terminal through the following paths: a Forward Relocation Response message sent by the target SGSN+ to the source mobility management entity, a handover command message sent by the source mobility management entity to a source base station and a Handover from EUTRAN Command message sent by the source base station to the terminal.

11. The method as claimed in claim 1, wherein, when the terminal is in an idle state,
the step of the target SGSN+ deducing the intermediate key used in the UTRAN according to the mapped traditional key obtained from the source mobility management entity comprises: deducing the intermediate key used in the enhanced UTRAN according to the mapped traditional key and further in combination with a first parameter;
the step of the terminal deducing the intermediate key used in the enhanced UTRAN by using an algorithm which is the same as that of the target SGSN+ according to the mapped traditional key comprises: deducing the intermediate key used in the enhanced UTRAN by using the algorithm which is the same as that of the target SGSN+, similarly according to the mapped traditional key and further in combination with the first parameter.

12. The method as claimed in claim 11, wherein,
the first parameter comprises one or more of the following parameters: a Public Land Mobile Network identifier (PLMN identifier), a core network node type, a sequence number (SQN), an Anonymity Key (AK), a user identifier, a random number generated by the target SGSN+ and a random number generated by the terminal.

13. The method as claimed in claim 12, wherein,
the random number generated by the target SGSN+ is sent to the terminal through a routing area update accepted message.

14. The method as claimed in claim 12, wherein,
the random number generated by the terminal is sent to the target SGSN+ through a routing area update request message.

15. A system for establishing an enhanced key when a terminal moves from an evolved universal terrestrial radio access network (EUTRAN) to an enhanced universal terrestrial radio access network (UTRAN), comprising a terminal and a target enhanced serving general packet radio service support node (SGSN+) in the enhanced UTRAN; wherein,
the SGSN+ is configured to: when the terminal moves from the EUTRAN to the enhanced UTRAN, deduce an intermediate key used in the enhanced UTRAN according to a mapped traditional key obtained from a source mobility management entity; and
the terminal is configured to: deduce the mapped traditional key, and, after deducing and obtaining the mapped traditional key, further deduce the intermediate key used in the enhanced UTRAN by using an algorithm which is the same as that of the SGSN+ according to the mapped traditional key;
wherein the enhanced UTRAN supports high speed packet access evolution (HSPA+) security function.

16. The system as claimed in claim 15, further comprising a target enhanced radio network controller (RNC+) in the enhanced UTRAN; wherein,
the SGSN+ comprises: a first receiving unit, a first key deduction unit and a first sending unit, wherein:
the first receiving unit is configured to: receive the mapped traditional key sent by the source mobility management entity;
the first key deduction unit is configured to: deduce the intermediate key according to the mapped traditional key; and
the first sending unit is configured to: send the deduced intermediate key to the RNC+;
the RNC+ is configured to: deduce an enhanced air interface integrity key ($IK_U$) and/or an enhanced air interface ciphering key ($CK_U$) according to the intermediate key; and
the terminal comprises: a second receiving unit and a second key deduction unit, wherein:
the second receiving unit is configured to: receive a command sent by a network side; and
the second key deduction unit is configured to: deduce the mapped traditional key according to the command, deduce the intermediate key by using the algorithm which is the same as that of the SGSN+ according to the mapped traditional key obtained by deducing, and deduce an enhanced air interface key by using an algorithm which is the same as that of the RNC+ according to the intermediate key.

17. The system as claimed in claim 15, further comprising a target enhanced radio network controller (RNC+) in the enhanced UTRAN; wherein,
the SGSN+ comprises: a first receiving unit, a first key deduction unit and a first sending unit, wherein:
the first receiving unit is configured to: receive the mapped traditional key sent by the source mobility management entity;
the first key deduction unit is configured to: deduce the intermediate key according to the mapped traditional key, and deduce an enhanced air interface integrity key ($IK_U$) and/or an enhanced air interface ciphering key ($CK_U$) according to the intermediate key; and
the first sending unit is configured to: send the deduced enhanced air interface key to the RNC+;
the RNC+ is configured to: store the received enhanced air interface key; and
the terminal comprises: a second receiving unit and a second key deduction unit, wherein:
the second receiving unit is configured to: receive a command sent by a network side; and
the second key deduction unit is configured to: deduce the mapped traditional key according to the command, deduce the intermediate key by using the algorithm which is the same as that of the SGSN+ according to the mapped traditional key obtained by deducing, and deduce an enhanced air interface key by using an algorithm which is the same as the SGSN+ according to the intermediate key.

18. The system as claimed in claim 16, wherein,
the first key deduction unit of the SGSN+ is further configured to: deduce a deformation intermediate key according to the mapped traditional key and the intermediate key, and send the deformation intermediate key to the target RNC+, wherein the deformation intermediate key is adapted for updating the enhanced air interface key when the terminal carries out relocation of a service radio network controller (SRNC) in the enhanced UTRAN network.

19. The system as claimed in claim 17, wherein,
the first key deduction unit of the SGSN+ is further configured to: deduce a deformation intermediate key according to the mapped traditional key and the intermediate key, and send the deformation intermediate key to the target RNC+, wherein the deformation intermediate key is adapted for updating the enhanced air interface key when the terminal carries out relocation of a service radio network controller (SRNC) in the enhanced UTRAN network.

* * * * *